United States Patent [19]
Groshens

[11] Patent Number: 4,732,800
[45] Date of Patent: Mar. 22, 1988

[54] PRODUCT ADAPTED TO BE STUCK HOT BY PRESSURE TO FLAT ARTICLES AND A PROCESS FOR ITS PRODUCTION

[75] Inventor: Pierre Groshens, Doingt-Flamicourt, France

[73] Assignee: Lainiere de Picardie, France

[21] Appl. No.: 821,846

[22] Filed: Jan. 23, 1986

[30] Foreign Application Priority Data

Jan. 23, 1985 [FR] France ................ 85 00922

[51] Int. Cl.$^4$ .................. B32B 7/02; B05D 5/10
[52] U.S. Cl. .................... 428/196; 427/208;
427/208.2; 427/210; 428/197; 428/200;
428/211
[58] Field of Search ............. 428/200, 349, 211, 196,
428/197; 427/208, 208.2

[56] References Cited

U.S. PATENT DOCUMENTS 2,107,276  2/1938  Anderson .................. 118/415
2,351,182  6/1944  Bateman ................ 427/208.2 X
4,076,881  2/1978  Sato ...................... 428/196 X

OTHER PUBLICATIONS

Hawley, G. G., "The Condensed Chemical Dictionary," Ninth Edition, New York, Von Nostrand Reinhold Company, 1977, pp. 175 and 706.

Primary Examiner—Evan K. Lawrence
Attorney, Agent, or Firm—Fred A. Keire

[57] ABSTRACT

A product and a method for its production, wherein the product is adapted to be stuck hot and by pressure to flat articles. The product comprises a flat flexible support having a first heat-fusible layer on its front surface and a second less heat-fusible layer on its back surface. In a preferred embodiment, both layers are discontinuous.

14 Claims, 6 Drawing Figures

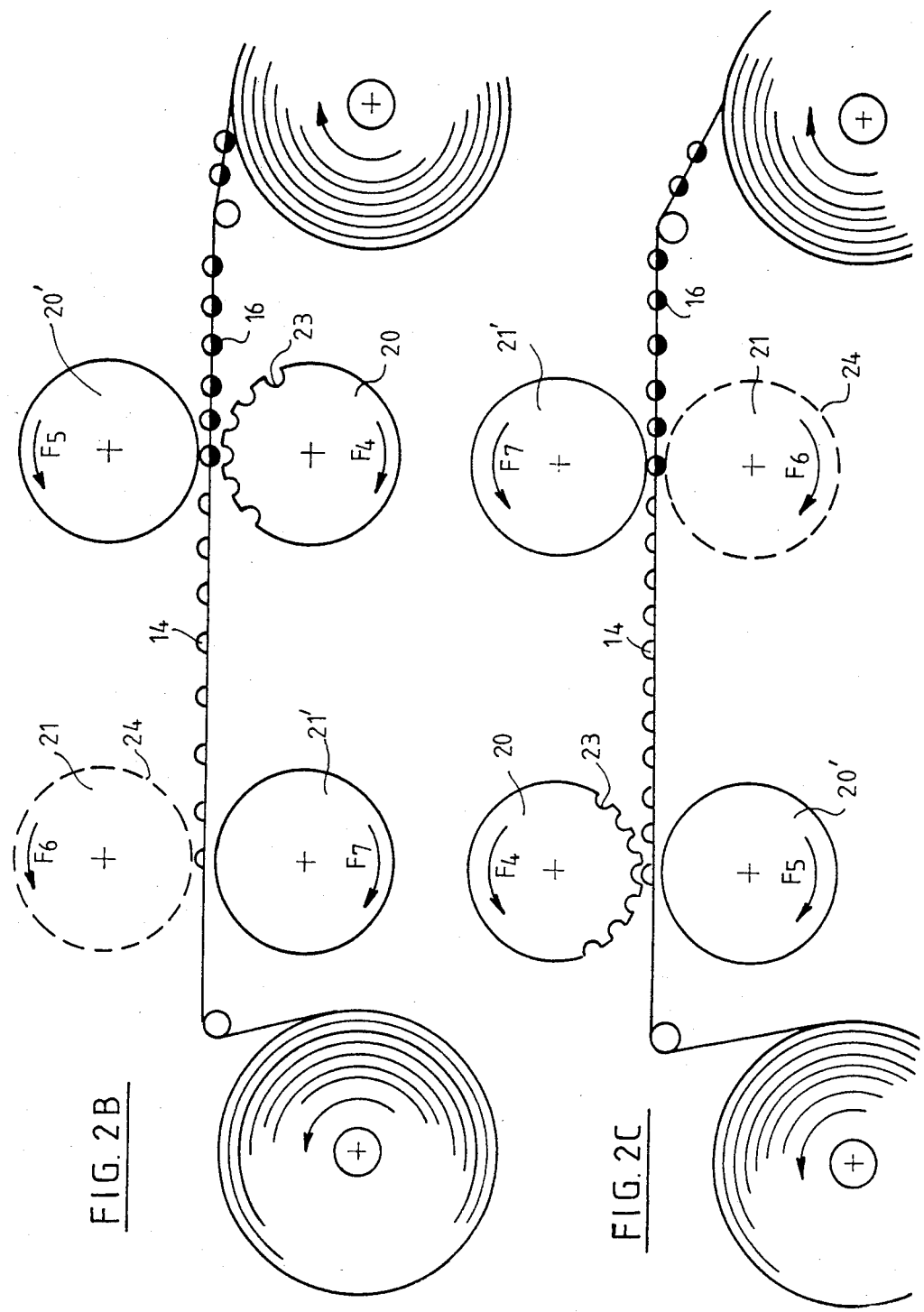

PRODUCT ADAPTED TO BE STUCK HOT BY PRESSURE TO FLAT ARTICLES AND A PROCESS FOR ITS PRODUCTION

BACKGROUND TO THE INVENTION

1. Field of the Invention

The invention relates to a product and a method for its production, wherein the product is adapted to be stuck hot and by pressure to flat fitted articles, for example, on textiles, such articles being operative as linings or stiffenings for garments.

2. Description of Prior Art

Composite products are already known which comprise a flat flexible support, such as a woven or knitted or non-woven fabric, covered by a layer (which may or may not be continuous) of a heat-fusible product which at ambient temperature is solid and non-stick but which at high temperatures is plastic, partly pasty and partly flowing, but nevertheless adhesive.

The composite element is then welded to the garment by the use of heat and pressure. However, the heat-fusible layer required to stick the composite element to the flat article (for example, curtains) melts and penetrates both the support and the flat article. Penetration by the heat-fusible substance into the support is called "crossing" and penetration into the fitted element is called "return". Consequently, because of return and/or crossing the heat-fusible substance may soil the surface of the tool heating and applying pressure to the composite element and the flat article.

The known and normally used composite elements come in different thicknesses and kinds of fiber and in different weave densities and in different nappings. Consequently, diffusion of the heat-fusible product through the support varies in extent in accordance with the nature of the support.

Endeavors have therefore been made to develop composite products adapted to be stuck hot and by pressure and embodied by a flat support covered by a reticular coating of adhesive consisting of at least two reticular layers disposed one above another, the top layer being disposed directly on the bottom layer, the bottom layer having less thermo-plastic creep than the top layer immediately above it.

To produce a product of this kind a network of heat-fusible glue is applied to the support element by means of an engraving member whose surface is formed with cavities arranged as a network corresponding to the network of adhesive, the cavities being such that the adhesive is introduced into them by scraping, the support element being placed on the surface of the engraving cylinder, possibly with heating. The process resides in placing first a first adhesive in powder form in the cavities of the engraving member, and immediately afterwards another adhesive in powder form having properties which may or may not be identical to the first adhesive in powder form is placed thereabove on the cavities, whereafter the two powder layers disposed one above another are transferred to the support element on the engraving member.

In this process, therefore, an engraving member is used which is actually a cylinder like those used in process engraving. The cavities of the cylinder are filled with a first adhesive in powder form and immediately above a second adhesive in powder form, the two adhesives then being transferred to the support element. The powder-form adhesives have a different melting point or a different thermoplastic creep from one another.

Unfortunately, this process has a number of disadvantages. The quantities of powder placed in the cylinder cavities are inaccurate and so the resulting layers are not uniform.

The top layer of adhesive must stick to the bottom layer, and so the usual course in this process is to give a high-temperature treatment to make the top layer stick to the bottom layer.

Also, a process of this kind cannot be used to deposit a non-stick bottom layer and the chemical and/or physical properties of the bottom and top layers must be compatible with one another.

SUMMARY OF THE INVENTION

An object of the invention is to provide a product in the form of a support element covered by an adhesive layer which cannot diffuse by crossing through the support element at the time when it is being stuck to the flat article (drapery) or at the time of the passage in manufacture.

The invention provides a product adapted to be stuck hot and by pressure on flat articles such as garments, the product being in the form of a flat flexible support element comprising a first heat-fusible layer applied to the front surface of the support element and a second layer less heat-fusible than the first layer and applied to the back surface of the support element.

In one embodiment, at least one layer is continuous whereas the other layer is discontinuous and is, for example, in the form of a random arrangement of dots.

Preferably, the layers are discontinuous and disposed in the form of dots on each surface of the support element, the dots of each of the layers being disposed opposite one another in cross-section.

Preferably, the less heat-fusible layer is made of a non-stick product, e.g. a silicone-based product.

Finally, the first heat-fusible layer is a thermoplastic polymer or copolymer, such as a polyethylene, copolyethylene, polyamide, copolyamide, polyester, copolyester or a dispersion or solution of these heat-fusible products or mixtures thereof.

The invention also relates to a process for producing such a novel product wherein a flat flexible element moves between two impression members each applying to each surface of the flat flexible element layers which may or may not be continuous and which are disposed opposite one another in cross-section.

In a preferred form of the process, the peripheral velocity of the impression members is adjusted. More preferably, the impression members are impression cylinders whose peripheral velocity is adjusted in dependence upon their respective diameters, the cylinders being either cylinders formed with peripheral cavities or cylinders formed with peripheral perforations, the cavities or perforations in one impression member corresponding to the cavities or perforations in the second impression cylinder at least at the point of tangency of the flat flexible article to each of the two impression cylinders.

Finally, the cylinders can have the same diameter and the same network of cavities or perforations.

Further objects and advantages of the invention will become apparent from the following description of preferred embodiments in conjunction with the accompanying drawings.

BRIEF DESCRIPTION OF THE DRAWINGS

FIGS. 2a, 2b and 2c are diagrammatic views of various embodiments of a machine used to perform the process according to the invention.

DESCRIPTION OF PREFERRED EMBODIMENTS

Figure 1:
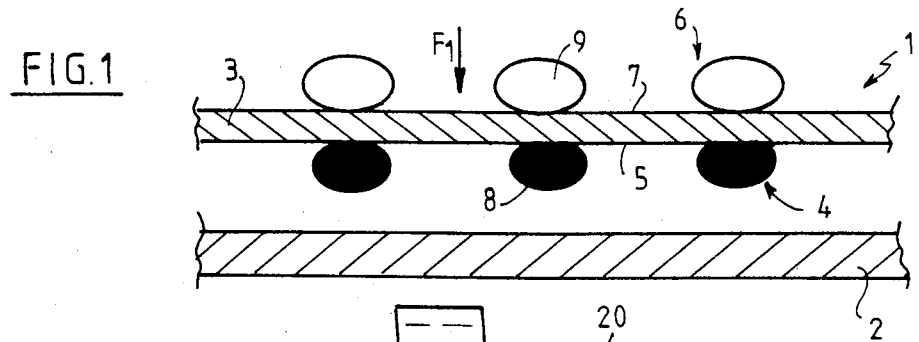
FIG. 1 is a view in cross-section of a composite product according to the invention opposite the flat article to which it is to be applied.

A product 1 adapted to be stuck hot and by pressure to flat articles 2 (for example, woven fabrics for garments) comprises a support element 3, which is flat and flexible. The support 3 can be, for example, made of paper or textiles or a woven or non-woven fabric or a knitted fabric.

The support 3 has a first heat-fusible layer 4 applied to front surface 5 of the support element 3 and a second layer 6 applied to back surface 7 of element 3. The first layer 4 is heat-fusible and the second layer 6 is heat-fusible too but less so than the first layer 4. The term "heat-fusible" denotes a layer which is of use for hot sealing, is solid and non-stick at ambient temperature but is plastic at elevated temperature and therefore to some extent pasty and flowing but adhesive. The first layer 4 therefore has a thermoplastic creep greater than the thermoplastic creep of the second layer 6. The product 1 according to the invention is such that the second layer 6 is operative as a barrier in relation to the first layer 4, i.e. it prevents return and crossing as hereinbefore defined.

By way of example, at least one layer is continuous while the other is discontinuous and is in the form, for example, of a random arrangement of dots.

Preferably, however, the second layer 6, whose thermoplastic creep is less than that of the first layer 4, is continuous in order to ensure a reliable barrier against return and crossing.

FIG. 1 shows a preferred embodiment of the invention in the form of discontinuous layers 4 and 6 disposed in dot form on each surface 5 and 7 of the support element 3. Dots 8 forming the first layer 4 disposed on the front surface 5 of the support element 3 are disposed directly opposite dots 9 forming the second layer 6 disposed on the back surface 7 of the support element 3.

Consequently, as shown in FIG. 1, when the composite element 1 is heated and, at the same time, pressure is applied in the direction indicated by arrow F1 to stick the composite element 1 to the flat element 2, the higher-creep dots 8 cannot return through the support 3 and cannot therefore cross through the back surface 7 of the support 3, to which surface the tool for heating and applying pressure to the composite element 1 is applied. Also, the volume and thermoplastic creep of the dots 8 are so selected that in the sticking of the composite element 1 to the flat element 2 the higher-creep dots 8 cannot pass completely through the flat element 2.

Preferably, the layer 4 consists of a thermoplastic polymer or copolymer, such as a polyethylene or copolyethylene or polyamide or copolyamide, whereas the less heat-fusible layer 6 consists of a non-stick substance, which may be a silicone-based substance.

Figure 2A:
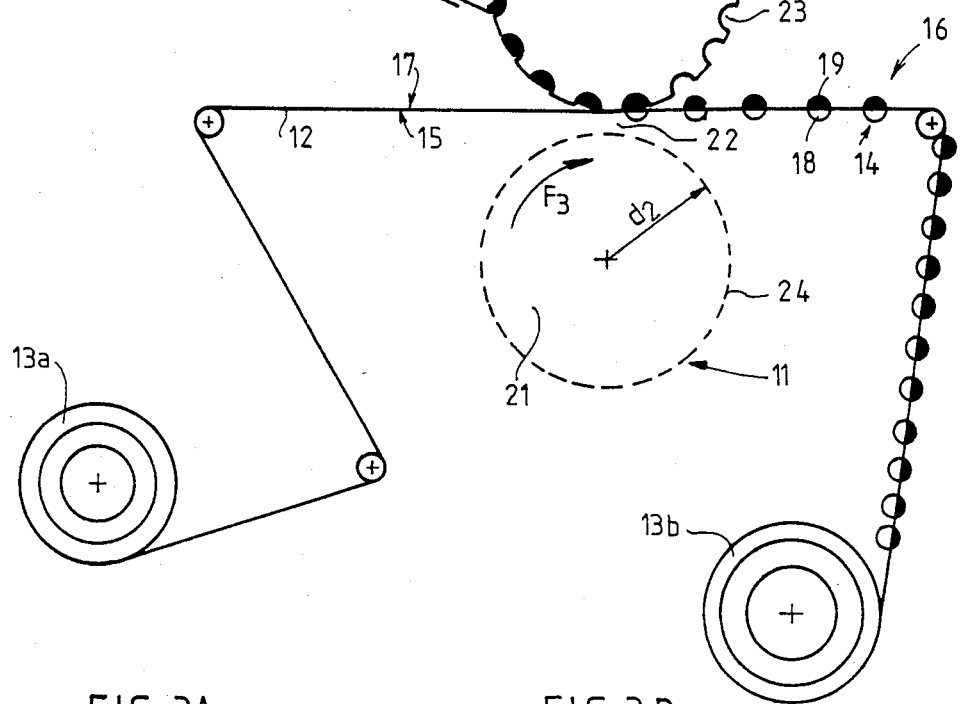

FIGS. 2a, 2b and 2c show apparatus for producing a composite product 1 in accordance with the invention.

In the process for the production of the novel product, a flat flexible element 12 moves between a first impression member 10 and a second impression member 11. The element 12 is drawn from a bobbin or reel 13a by the opposite movement of a take-up bobbin or reel 13b for the product as manufactured. Each member 10, 11 deposits on each surface 15, 17 of the element 12 layers 14, 16 which may or may not be continuous and which are disposed opposite one another in cross-section. The layers 14, 16 can be, for example, dots 18, 19 disposed opposite one another in cross-section.

The process is such that the peripheral velocity of the impression members 10, 11 is adjusted. More preferably, the impression members are impression cylinders 20, 21 rotating in opposite directions as indicated by arrows F2, F3. The member 20 has a diameter d1 and the member 21 has a diameter d2. The peripheral velocity of the cylinders 20, 21 is so adjusted in dependence upon the respective cylinder diameter d1, d2 that the cylinders 20, 21 deposit dots 18, 19 respectively opposite one another.

Preferably, the cylinders 20, 21 are cylinders formed with peripheral cavities 23, and so the cylinders 20, 21 can be cylinders such as are used in process engraving.

According to another feature of the invention, the cylinders 20, 21 can be formed with perforations 24, i.e. they are impression cylinders used in silk screen printing.

In an embodiment of the invention shown in FIG. 2a, the cylinders 20, 21 are disposed one above another and are tangential to at least one point 22, the plane containing the axes of rotation of the cylinders being perpendicular to the plane of the flexible element 12. The same is tangential at the point 22 to each of the two cylinders 20, 21 between which it moves.

The cylinders 20, 21 are so adjusted that their cavities 23 and perforations 24 respectively are disposed opposite one another at least at the point 22 at which the article 12 is tangential to each of the two cylinders 20, 21.

In another embodiment of the invention, instead of being disposed one above another the two cylinders 20, 21 are disposed consecutively as considered in the direction of movement of the flexible element 12. In this case cylinders 20', 21' are provided in a supportive tangential and superposed relationship to the cylinders 20, 21 respectively. The plane containing the axes of the cylinders 20, 20' and the plane containing the axes of the cylinders 21, 21' are perpendicular to the plane of the flexible element 12. The support or backing cylinders 20', 21' support the flexible element 12 and ensure correct movement thereof first between the cylinders 20, 20' and then between the cylinders 21, 21'.

As a variant the cylinders 20', 21' can be cylinders 20', 21' for driving the element 12 and/or the cylinders 20, 21. The speeds of rotation of the four cylinders 20, 21, 20', 21' and the distances between them are carefully adjusted to ensure correct synchronism between the cylinders 20 and 21. For example, the four cylinders 20, 21, 20', 21' are driven by a common motor and/or are interconnected mechanically and/or kinetically. The cylinders 20, 21, 20', 21' therefore have peripheral velocities such that the layers 14, 16, although not applied simultaneously, are deposited opposite one another in cross-section. The cylinders 20, 20' rotate in opposite directions (arrows F4,F5), as do the cylinders 21,21' (arrows F6,F7).

Thus, according to a feature of the invention, one cylinder, for example, the cylinder 20, is a process engraving cylinder whereas the other cylinder, for example, the cylinder 21, is a silk screen impression cylinder.

In an embodiment shown in FIG. 2b, the silk screen printing impression cylinder 21 and its associated backing cylinder 21' are disposed upstream of the process engraving cylinder 20 and its associated backing cylinder 20', the terms "upstream" and "downstream" being referred to the direction of movement of the flexible element 12.

Also, the cylinders 20 and 21 can be disposed below or above the element 12 according to the results required for the layers 14, 16. In the embodiment of FIG. 2b the cylinder 20 deposits the layer 16 and the cylinder 21 deposits the layer 14.

In an embodiment shown in FIG. 2c the process engraving cylinder 20 and the associated backing cylinder 20' are disposed upstream of the silk screen printing impression cylinder 21 and its associated backing cylinder 21'. The cylinder 20 deposits the layer 14 and the cylinder 21 deposits the layer 16.

The cylinders 20, 21, 20', 21' run at speeds such that the cavities 23 and the perforations 24 are disposed opposite one another in cross-section.

Figure 3A:
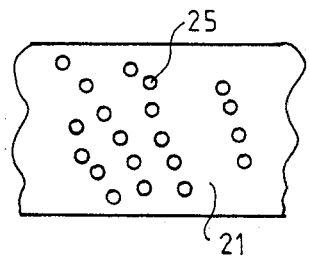
FIGS. 3a and 3b are diagrammatic views of impression cylinders used in accordance with the invention.
Figure 3B:
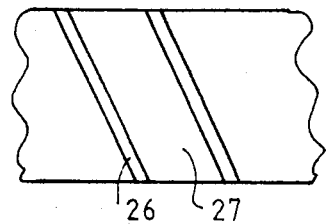

FIGS. 3a and 3b show cylinders formed with perforations, i.e. silk screen printing cylinders.

In FIG. 3a the cavities 25 are disposed in a network on the cylinder 21 whereas the perforations 26 are disposed in rows on a cylinder 27.

The perforations in one cylinder may therefore not correspond to the perforations or cavities in the other, but the perforations or cavities in any cylinder are such that the higher-creep dots 8 are always deposited opposite the bottom possibly discontinuous and lower-creep layer 9.

Preferably, the impression cylinders are of the same diameter, run at the same speed and have the same network of cavities 23 or perforations 24.

According to another embodiment of the invention, a double layer comprising chemical products which can have a cross-linking action on the base of the coating layer (i.e. the surface in contact with the textile support) is deposited on the support element 12.

I claim:

1. A product adapted to be stuck hot and by pressure on flat articles such as garments, comprising a flat flexible support, a first heat-fusible layer applied to a front surface of the support, and a second layer less heat-fusible than the first layer and applied to a back surface of the support, wherein the said layers are discontinuous and disposed in the form of dots on the respective surfaces of the support, the dots of the layers being disposed opposite one another in cross-section.

2. The product of claim 1, in which the the second, less-fusible layer is silicon-based.

3. The product of claim 1, in which the first, more heat-fusible layer is made of a thermoplastic polymer or copolymer, polyethylene, copolyethylene, polyamide, copolyamide, polyester, copolyester or a dispersion or solution of these heat-fusible substances or mixtures thereof.

4. A process for the production of a product which comprises a flat flexible support, a first heat-fusible layer applied to a front surface of the support, and a second layer less heat-fusible than the first layer and applied to a back surface of the support, wherein the said layers are discontinuous, the process comprising the steps of passing the flat flexible support between at least two impression members, and applying the said layers to the said surfaces of the support by means of the impression members in such a manner that the said layers are disposed opposite one another in cross-section.

5. The process of claim 4, wherein said impression members have a peripheral velocity, and further comprising the step of adjusting the peripheral velocity of the impression members so that they deposit said layers disposed opposite one another in cross section.

6. The process of claim 4, in which the impression members are cylinders.

7. The process of claim 6, in which the cylinders have peripheral cavities to form the discontinuous layers.

8. The process of claim 6, in which the cylinders have peripheral perforations to form the discontinuous layers.

9. The process of claim 6, in which to form the discontinuous layers one of the cylinders has peripheral cavities and the other cylinder has peripheral perforations.

10. The process of claim 6, in which the cylinders are tangential to a common point, and the flexible support passing between the cylinders is also tangential to each cylinder at the said point.

11. The process of claim 10, in which cavities or perforations in one impression cylinder correspond to cavities or perforations in the other cylinder at least at the said point of tangency to form the discontinuous layers.

12. The process of claim 6, in which the cylinders have the same diameter and identical networks of cavities or perforations to form the discontinuous layers.

13. The process of claim 6, in which backing cylinders are disposed tangential to and above the respective impression cylinders, the backing cylinders and impression cylinders running at peripheral velocities such that the said layers are disposed opposite one another in cross-section.

14. A process for the production of a product which comprises a flat flexible support, a first heat-fusible layer applied to a front surface of the support, and a second layer less heat-fusible than the first layer and applied to a back surface of the support, wherein the said layers are discontinuous, the process comprising the steps of passing the flat flexible support between at least two impression members, and applying the said layers to the said surfaces of the support by means of the impression members in such a manner that the said layers are disposed opposite one another in cross-section, in which the impression members are cylinders and in which the cylinders are disposed consecutively as considered in the direction of movement of the support.

* * * * *